United States Patent [19]

Uchida et al.

[11] 3,898,677
[45] Aug. 5, 1975

[54] SINGLE LENS REFLEX CAMERA HAVING MEANS FOR AUTOMATICALLY ADJUSTING EMITTED LIGHT

[75] Inventors: Yasuo Uchida; Kazuo Shiozawa; Yoshitaka Kuroyanagi, all of Hachioji, Japan

[73] Assignee: Konishiroku Photo Industry Co. Ltd., Tokyo, Japan

[22] Filed: Feb. 11, 1974

[21] Appl. No.: 441,276

[30] Foreign Application Priority Data
Feb. 9, 1973  Japan................................ 48-17440
Feb. 9, 1973  Japan................................ 48-17441

[52] U.S. Cl. ..................... 354/27; 354/33; 354/126
[51] Int. Cl.² ............................................ G03B 7/14
[58] Field of Search .......... 354/27, 32, 33, 126, 127

[56] References Cited
UNITED STATES PATENTS
3,547,017  12/1970  Harvey................................. 354/33
3,648,104  3/1972  Ackermann .................... 354/127 X
3,709,123  1/1973  Tokutomi ......................... 354/32 X Primary Examiner—Richard A. Wintercorn
Attorney, Agent, or Firm—James E. Nilles

[57] ABSTRACT

A single lens reflex camera having means for automatically emitting adjusted light is disclosed. The camera so constructed that the either one of the following series operations are effected in succession.

Shutter release - Operation of automatic preset diaphragm - Preparatory emission of light switch ON - Detection of amount of preparatory emission of light - Spring up of movable mirror - Starting of shutter operation - Main emission of light (photographing).

Shutter release - Operation of automatic preset diaphragm and spring up of movable mirror - Preparatory emission of light switch ON - Detection of amount of preparatory emission of light - Retraction of light receiving element - Starting of shutter operation - Main emission of light (photographing).

3 Claims, 4 Drawing Figures

SINGLE LENS REFLEX CAMERA HAVING MEANS FOR AUTOMATICALLY ADJUSTING EMITTED LIGHT

This invention relates to cameras and more particularly to a single lens reflex camera having means for automatically emitting adjusted light.

A system for automatically emitting adjusted light is of a system in which the brightness of a subject to be photographed is measured by a flash light emitting device side or by the camera side and exposure conditions such as a photographing distance, iris value and the like or the amount of emitted light matched with these exposure conditions are automatically determined when photographs are taken by changing, for example, the amount of charge of a condenser for use with a main emission of light based on the brightness of the subject measured. In a single lens reflex camera and the like which makes use of TTL light measuring system, a light receiving element for receiving light from a subject to be photographed is arranged behind a photographing lens, for example, in a mirror, finder light passage or photographing light passage between the mirror and a film surface. As a result, when the mirror is sprung up or the light receiving element is retracted from the photographing light passage, the light reflected from the subject can not be measured. Thus, it is impossible to utilize a conventional system of measuring light when the flash light is emitted toward the subject to be photographed (during the film exposure).

An object of the invention is to provide a single lens reflex camera in which a preparatory emission of light is performed prior to a normal emission of flash light (main emission of light), the amount of light reflected from a subject to be photographed is measured prior to the spring up of the mirror, the light receiving element and the like is retracted and the subject information is memorized until the photographs are taken.

Another object of the invention is to provide a single lens reflex camera having means for automatically emitting adjusted light and a movable mirror for use with a finder and constructed such that the operation of an automatic preset diaphragm is effected prior to the spring up operation of said mirror, and that a preparatory emission of light circuit of said means for automatically emitting adjusted light is closed by means of a signal from a member relating to the photographing operation or a delay means based on said signal at any instant from completion of the operation of said automatic preset diaphragm to the spring up operation of said mirror.

The invention will be described in greater detail with reference to the accompanying drawings, in which.

Figure 1:
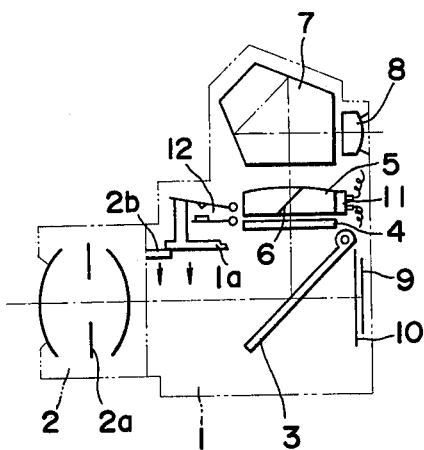
FIG. 1 is a simplified illustration of one embodiment of the camera according to the invention.

Referring to FIG. 1, reference numeral 1 designates a lens replaceable type single lens reflex camera having means for automatically emitting adjusted light. The camera 1 is provided at its lens mounting part with a driving member 1a for operating an automatic preset diaphragm.

The driving member 1a is interlocked with a member 2b arranged at the lens side and interlocked with the diaphragm.

Reference numeral 2 designates a replaceable type photographing lens provided with an automatic preset diaphragm 2a. From the rear end of the photographing lens 2 is projected the member 2b interlocked with the diaphragm 2a. The member 2b engages with the diaphragm driving member 1a when the lens 2 is mounted on the camera. Reference numeral 3 designates a movable mirror for use with a finder, 4 a focusing plate, 5 a condenser lens provided at its center with an inclined translucent mirror 6, 7 a pentadach prism, 8 a finder eye piece, 9 a film, and 10 a focal-plane shutter interlocked with a strobo synchro-switch (not shown) by means of a conventional means.

The synchro-switch serves to open and close a main emission of light circuit included in the means for automatically emitting adjusted light. Reference numeral 11 designates a light receiving element connected to a circuit for detecting the amount of reflected preparatory emission of light (not shown) included in the means for automatically emitting adjusted light. The light receiving element 11 is composed of a side surface of the condenser lens 5 and arranged at the reflected light passage side of the translucent mirror 6. For example, the light receiving element 11 may be arranged in a finder light passage and constructed such that it can be inserted into or removed from the finder light passage. Alternatively, the light receiving element 11 may be arranged near the eye piece 8 and the amount of light may be measured by a light receiving lens as the brightness of a focal-plane. The light receiving element 11 may be replaced by a light receiving element of TTL type exposure meauring circuit. In this case, provision may be made of a turn-over switch for the purpose of selectively using either the circuit for detecting the amount of reflected preparatory emission of light or the TTL type exposure measuring circuit.

Reference numeral 12 designates a switch connected to the circuit for detecting the amount of reflected preparatory emission of light and for starting the preparatory emission of light. The switch 12 is interlocked with the diaphragm driving member 1a so as to make the circuit for detecting the amount of reflected preparatory emission of light ON when the operation of the diaphragm is completed.

The camera constructed as above described will operate as follows:

If the diaphragm driving member 1a is displaced in a direction shown by an arrow in FIG. 1 in response to the shutter release operation, the diaphragm interlocking member 2b causes the preset diaphragm 2a to close to a given operating value. When the operation is completed, the switch 12 for starting the preparatory emission of light becomes ON, and as a result, at this instant the preparatory emission of light is performed. Thus, the light beam reflected from a subject to be photographed when the preparatory emission of light is impinged on the subject passes through an opening determined by the automatic preset diaphragm 2a and impinges on the light receiving element 11. The amount of light impinged on the light receiving element 11 is detected by the circuit for detecting the amount of reflected preparatory emission of light. The amount of light thus detected is compared with an amount of light set during a proper film exposure. The result thus obtained is capable of controlling the amount of main emission of light to be succeeded.

Then, the mirror 3 is sprung up and a shutter first curtain is passed across and in front of the film 9. Immediately before it or immediately before the opening of the film 9 is closed the strobo synchro-switch, and as a result, the main emission of light is performed to complete the flash synchro-photographing.

As stated hereinbefore, the invention, if applied to a camera comprising a light receiving element arranged in a finder light passage, is capable of not only automatically emitting adjusted light under a given opening condition of the diaphragm 2a and hence freely selecting the opening value of the diaphragm 2a, but also precisely maintaining the opening value of the diaphragm 2a in correspondence with the practical amount of light near that surface conjugate to both the output from the light receiving element 11 and the film 9 over all range of the diaphragm 2a, thereby performing highly precise synchro-photographing.

Figure 2:
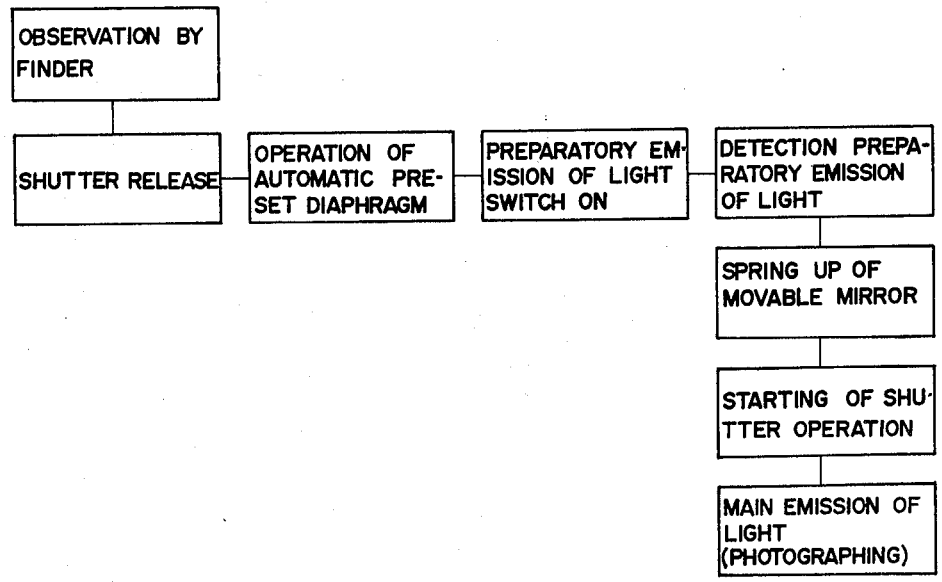
FIG. 2 is a block diagram for explaining successive operations of the camera shown in FIG. 1.

In the embodiment shown in FIGS. 1 and 2, the preparatory emission of light is effected in association with completion of the closing operation of the diaphragm 2a, so that a difference in time between the preparatory emission of light and the main emission of light becomes comparatively small, and as a result, both the preparatory and main emissions of light can be perceived by the naked eye as if one light beam is emitted. In addition, if the invention makes use of the light receiving element of the TTL type exposure measuring circuit, the additional advantage as described above can be obtained.

The invention is not limited to the embodiment shown in FIGS. 1 and 2 and various modifications thereof are possible.

Figure 3:
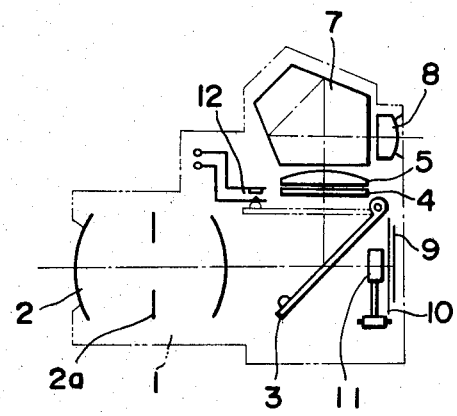
FIG. 3 is a simplified illustration of another embodiment of the camera according to the invention.
Figure 4:
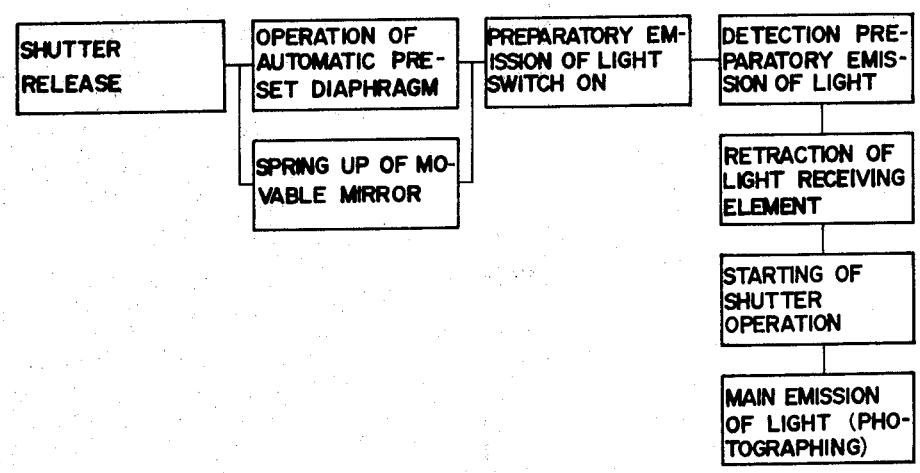
FIG. 4 is a block diagram for explaining successive operation of the camera shown in FIG. 3.

In FIGS. 3 and 4 are shown another embodiment of the invention. In the present embodiment, the light receiving element 11 is arranged in the photographing light passage between the mirror 3 and the focal-plane shutter 10. The light receiving element 11 is constructed such that, in the case of photographing, the light receiving element 11 is remained in the photographing light passage until at least the preset diaphragm 2a is closed to a given value and the mirror 3 is sprung up, and that the light receiving element 11 is retracted out of the photographing light passage when the aperture of the shutter 10 becomes opened.

As diagrammatically illustrated in FIG. 4, in the first place the shutter 10 is released and then the automatic preset diaphragm 2a and the mirror 3 are operated. When the mirror 3 is sprung up, the switch 12 for starting the preparatory emission of light is closed to perform the preparatory emission of light. As a result, the amount of the main emission of light is controlled in the same manner as in the case of the embodiment described with reference to FIGS. 1 and 2.

After the mirror 3 has been sprung up, the shutter first curtain is passed across and in front of the film 9. Immediately before such movement of the shutter first curtain or immediately before the opening of the film aperture, the light receiving element 11 is retracted out of the photographing light passage to ready for allowing light to incident on the film 9. Then, the light beam from the subject to be photographed is incident on the film 9 in a normal manner.

When the shutter 10 is fully opened, the strobo synchro-switch is closed to perform the main emission of light, thereby completing the flush light synchro-photographing.

What is claimed is:

1. In a single lens reflex camera provided with an objective lens, an automatically adjustable diaphragm, a shutter release, a view finder having an eyepiece, and means for automatically emitting adjusted light which comprises preparatory light emitting means, main light emitting means and means for control of the main light including a photoelectric element to receive the light reflected from an object illuminated by the preparatory light and passed through the objective lens, the improvement comprising means for effecting automatic adjustment of said diaphragm upon a shutter-releasing operation, means for initiating preparatory light emission after completion of said automatic adjustment of said diaphragm, and means for preventing light from said view finder eyepiece from impinging on said photoelectric element.

2. A single lens reflex camera according to claim 1 wherein said means for preventing light from said view finder is a movable mirror.

3. A single lens reflex camera according to claim 1 wherein said means for preventing light from said view finder comprises a condenser lens having a translucent mirror therein and wherein said photoelectric element is disposed adjacent a side edge of said condenser lens for receiving light from said translucent mirror.

* * * * *